United States Patent
Moritani et al.

(12) 
(10) Patent No.: US 6,411,591 B1
(45) Date of Patent: Jun. 25, 2002

(54) OPTICAL RECORDING MEDIUM AND OPTICAL MEMORY DEVICE

(75) Inventors: Koichi Moritani, Yokohama; Akemi Hirotsune, Higashimurayama; Motoyasu Terao, Hinode; Yasushi Miyauchi, Akishima; Toshimichi Shintani, Kodaira; Takashi Naito, Hitachiota; Takashi Namekawa; Hiroki Yamamoto, both of Hitachi, all of (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/485,846

(22) PCT Filed: Sep. 11, 1998

(86) PCT No.: PCT/JP98/04102

§ 371 (c)(1), (2), (4) Date: Feb. 17, 2000

(87) PCT Pub. No.: WO99/14764

PCT Pub. Date: Mar. 25, 1999

(30) Foreign Application Priority Data

Sep. 18, 1997 (JP) ............................................. 9-252963

(51) Int. Cl.[7] .............................. G11B 7/24; B32B 3/02
(52) U.S. Cl. ................ 369/275.2; 428/64.4; 430/270.13
(58) Field of Search ........................... 369/275.2, 275.1, 369/275.3, 273, 272; 428/64.1, 64.4; 430/270.13, 270.15, 320, 321

(56) References Cited

U.S. PATENT DOCUMENTS 5,691,072 A * 11/1997 Izumi et al.
5,846,625 A * 12/1998 Terao et al.
6,011,757 A * 1/2000 Ovshinsky .................... 369/13
6,231,945 B1 * 5/2001 Miyamoto et al. .......... 428/64.1

* cited by examiner

*Primary Examiner*—Tan Dinh
(74) *Attorney, Agent, or Firm*—Antonelli, Terry, Stout & Kraus, LLP

(57) ABSTRACT

The optical recording medium has sandwiched between protective layers a mask layer whose refractive index is changed in one part within a light spot when irradiated with a laser beam of 2 to 4 mW. In a region where the refractive index is changed or in other remaining regions, the difference in the amount of reflected light between the crystalline state and the amorphous state is so small that a reproduced signal is difficult to identify. By reducing the size of a portion where the reproduced signal can be seen, it is possible to read high-density recorded information.

12 Claims, 2 Drawing Sheets

OPTICAL RECORDING MEDIUM AND OPTICAL MEMORY DEVICE

TECHNICAL FIELD

The present invention relates to an optical recording medium and an optical memory device capable of reading or recording in real time digital information, such as computer data, facsimile signals and digital audio signals, by an optical beam such as a laser beam. More specifically, the invention relates to a high density phase change optical disk and a high density read-only optical disk.

BACKGROUND ART

As information diversification has progressed in recent years, there are growing demands for a rewritable optical disk that allows a user to record or rewrite information. Further, an increase in the amount of information has called for large-capacity rewritable optical disks. Under these circumstances, a variety of research organizations are actively engaged in studies for increasing the recording density of an optical disk. These studies include those on a method for reducing the size of a recording mark reducing the apparent spot diameter of an information reading laser beam by reducing the wavelength of a recording laser beam or by increasing the numerical aperture (NA) of a focusing lens to increase the recording density, as described in the Nikkei Electronics, Vol. 521, page 92 (1991). A super-resolution reading method using a super-resolution layer of organic pigments is reported in the proceedings of lectures in the Japan Society of Applied Physics, page 1000, 19p-K-5 (autumn, 1994).

The method of increasing the recording density by using the super-resolution layer to reduce the apparent spot diameter of an information reading laser beam is important because it can easily be combined with other recording density enhancing methods.

DISCLOSURE OF INVENTION

The object of the invention is to provide an optical recording medium and an optical memory device which have a large capacity and can perform a recording or reading operation a large number of times.

In the present invention, the recording medium has a construction in which a super-resolution layer (hereinafter called a mask layer) whose refractive index is changed in a part of a light spot by a laser beam of 2 to 4 mW is sandwiched by inorganic protective layers and in which the difference in the amount of reflected light between a crystalline state of the film and an amorphous state of the film is so small in either the region where the refractive index has changed or other remaining regions that the playback signals are difficult to identify.

That is, (1) An optical recording medium that enables at least information to be read out by irradiation of a light, comprises: a mask layer containing at least one of elements in groups Ib, IIb, IIIa to VIIa, and VIII in 10 to 40 atomic percent and also containing oxygen; wherein when the read operation is performed at a reading laser power of 1 mW by using a lens with a predetermined wavelength and a predetermined numerical aperture and with a light spot focused to nearly a diffraction limit, the difference between the amount of reflected light from recording marks and the amount of reflected light from spaces between the recording marks is 25 or less, with the amount of reflected light from the spaces taken as 100, and there is a laser power in a reading laser power range of 2 to 4 mW that causes the difference between the amount of reflected light from recording marks and the amount of reflected light from spaces between the recording marks to be 30 or more, with the amount of reflected light from the spaces taken as 100. Alternatively, (2) An optical recording medium that enables at least information to be read out by irradiation of a light, comprises: a mask layer containing at least one of elements in groups Ib, IIb, IIIa to VIIa, and VIII in 10 to 40 atomic percent and also containing oxygen; wherein when the read operation is performed by using a lens with a predetermined wavelength and a predetermined numerical aperture and with a light spot focused to nearly a diffraction limit, there is a laser power in a reading laser power range of 2 to 4 mW that causes the difference between the amount of reflected light from recording marks and the amount of reflected light from spaces between the recording marks to be 25 or less, with the amount of reflected light from the spaces taken as 100, and in a lower laser power range there is a laser power that causes the difference between the amount of reflected light from recording marks and the amount of reflected light from spaces between the recording marks to be 30 or more, with the amount of reflected light from the spaces taken as 100. More preferably, the mask layer further includes silicon.

The measurement of the reflected light is taken at the recording marks and spaces that are three times or more longer than the shortest recording mark.

More preferably, the mask layer uses an inorganic film containing at least one of elements, such as Co, O and Si, in 30 atomic percent or more to equivalently reduce the spot diameter of the laser beam. The conventional organic super-resolution layer has a property such that, when applied with a laser beam with an intensity in excess of a threshold value for a predetermined duration, the layer loses molecules in a ground state and thus can no longer absorb light (saturation of absorption). On the other hand, the mask layer of this invention has a property such that when the mask layer is applied with a laser beam, the refractive index changes without changing the absorption coefficient. To take full advantage of this property, a laminated film is provided with the characteristics described in (1) and (2) above. As a result, in a recording medium of the type (1), when the normal reading laser power of about 1 mW is used, the difference in the amount of reflected light between the crystalline state and the amorphous state of the phase change recording film is small and therefore the reproduced signal small. As the reading laser power is increased, the refractive index of the mask layer changes in a part of the light spot to produce a large playback signal. It should be noted, however, that even at this time the remaining region in the light spot has a small difference in the amount of reflected light or, in other words, masked. When the reading laser power is at around 1 mW, the amounts of reflected light from both states may be low. However, it is not required that the reflected light amounts from both states be low. As described above, when information on the track is read out, only the information on those portions where the refractive index is changed can be read. This produces the same effect as when the information is read by using a small light spot (super-resolution effect). At this time, if the mask layer is provided between the substrate with at least its surface formed of an organic material and the recording film, the super-resolution effect can be obtained at a low reading laser power. However, because the mask layer absorbs light, the recording power becomes high. In that case, it is preferred that the mask layer be sandwiched between other inorganic protective layers to avoid unwanted influences from substrate deformations caused by heat generated in the mask layer. In another structure, the mask layer may, for example, be formed between an aluminum alloy reflective layer and a ZnS-based inorganic protective layer, which is on the reflective layer side of the recording film. The mask layer, when interposed between inorganic protective layers, has an increased mechanical strength and thus undergoes a minimal deformation even after a large number of rewriting operations. When the mask layer is formed on the reflective layer side of the recording film, the heat generated in the mask layer can be released toward the reflective layer, minimizing thermal damages to the mask layer. This reduces deformations and structural breaks of the layer due to heat during the recording operation. At this time, a reflective layer with a large thermal conductivity should preferably be used because it helps release heat more quickly. It is more preferred that the mask layer be formed in contact with the reflective layer for an increased heat dissipation effect.

In a recording medium of the type (2), when a reading laser power of 2 to 4 mW is used, the refractive index of the mask layer changes in a part of the light spot, in which the difference in the amount of reflected light between the crystalline state and the amorphous state of the phase change recording film is small and therefore the reproduced signal small. That is, the area where the refractive index has changed is masked. In the remaining area in the light spot a large reproduced signal can be obtained, realizing the super-resolution reading.

The area in which a refractive index change occurs is an area where the accumulated amount of light received is large or an area where the temperature rises due to the applied light. An example of such an area is illustrated in FIG. 1.

Of the recording mediums (1) and (2), the type (1) is more advantageous in narrowing the track pitch because the area where the refractive index changes constitutes an unmasked region (called aperture) so that the expanse in a direction perpendicular to the recording track in the unmasked region is narrow and the signal from the adjacent track is not easily seen.

The reading laser power of 2 to 4 mW in the recording mediums (1) and (2) corresponds, in the ordinary optical system, to an average power density of 3 mW/$\mu m^2$ to 6 mW/$\mu m^2$ in a range of up to $1/e^2$ of a peak power density.

In this invention, the combined use of a recording film and a mask layer whose refractive index is changed by a laser power, which is higher than the average reading power and lower than the recording power (high-level power), can execute good recording and playback operations.

The present invention further has the following features.

(3) Inorganic protective layers are provided on both sides of the mask layer.

(4) The mask layer is formed between the recording film and the reflective layer.

(5) The mask layer is formed between the recording film and the substrate.

(6) The mask layer contains at least one of elements, Co, Fe, Ni, Cu and Ag, in 10 to 40 atomic percent.

(7) Of the constitutional components making up the mask layer, one or more components whose melting point is 100° C. higher than the melting point of the recording film occupy 80% or more of the total number of atoms of the mask layer.

(8) Of the constitutional components making up the mask layer, one or more components whose melting point is 1000° C. or higher occupy 80% or more of the total number of atoms of the mask layer.

(9) Information can be recorded by using 2.5 to 8 times the laser power that produces a difference in the amount of reflected light of 20 or less.

(10) Of the constitutional components making up the recording film, one or more components with a composition of Ge—Sb—Te or In—Sb—Te occupy 80% or more of the total number of atoms of the record film.

(11) The optical memory device can read information from the optical recording medium described in (1) or (2) and which has a means for setting the laser power at a high level that produces a large playback signal during the read operation and for setting the laser power at a lower level only when performing the autofocusing and tracking operations.

In this invention, the reading beam may use a pulse beam rather than a continuous light (DC light).

Among the preferable recording films that can be used in this invention are a hole type recording film, a high melting point crystalline-amorphous phase change optical recording film capable of high-speed recording and erasure, a recording film utilizing an amorphous-amorphous phase change, and a crystalline-crystalline phase change record film utilizing changes in crystal system and crystal grain diameter. Other types of recording film may also be used.

By forming the mask layer of an inorganic material and interposing the mask layer between layers of inorganic materials, the invention increases the number of times that the rewriting operations can be carried out. This is because the inorganic protective layers on both sides of the mask layer improve the mechanical strength and because one of the inorganic protective layers interposed between the substrate and the mask layer helps prevent thermal deformations of the substrate. Setting the mask layer and the reflective layer in a closer relationship can release the heat generated in the recording film and the mask layer to the reflective film quickly. The reflective film in this case should preferably be formed of such materials as aluminum alloy with a high thermal conductivity because a greater heat releasing effect can be produced.

The present invention is particularly suited for a phase change type optical disk capable of what is generally called a one-beam overwrite operation that records, by the application of a laser beam, new information while at the same time erasing existing information. The invention is also suited for a write once type disk that cannot be overwritten. This invention is particularly effective for chalcogenide (e.g., a recording film made mainly of In—Se, Ge—Sb—Te or In—Sb—Te) which contains at least one of chemical elements, Te, Se and S, in 30 to 85 atomic percent, and also for a recording film made mainly of In—Sb. Other recording mediums with different recording principles may also be used.

In addition to the disk, the recording medium of this invention may take other forms such as tape and card.

BEST MODE FOR CARRYING OUT THE INVENTION

[Embodiment 1]

Figure 1:
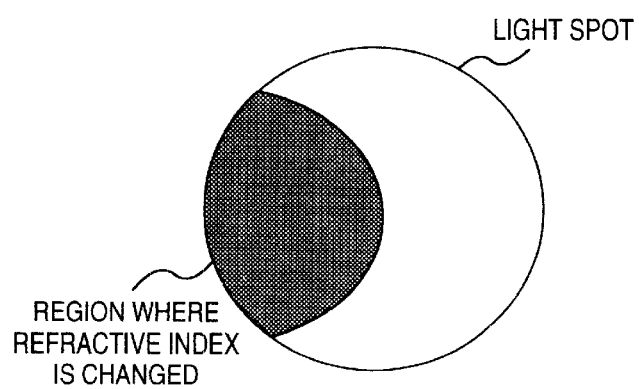
FIG. 1 is an explanatory diagram showing the relationship between a light spot and a refractive index changing region in the mask layer.
Figure 2:
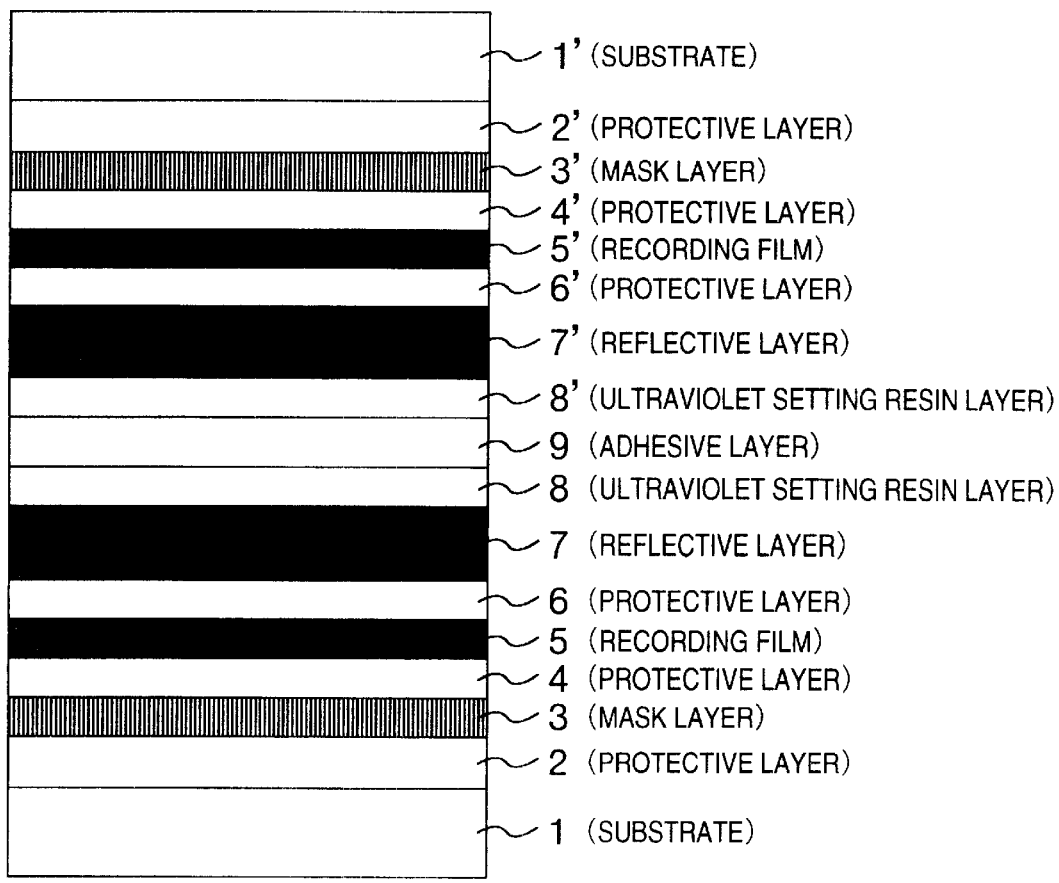
FIG. 2 is a cross section of an optical recording medium according to a first embodiment of the invention.

FIG. 2 shows one example of a cross section of a disk according to this embodiment. The disk is made by first forming, by a magnetron sputtering, a ZnS—SiO$_2$ protective layer 2 to a thickness of about 150 nm over a polycarbonate substrate 1 which is 12 cm in diameter and 0.6 mm thick and which has a continuous groove therein. Over the ZnS—SiO$_2$ protective layer 2 a mask layer which is $(CoO)_{35}(SiO_2)_{46}(NaO)_9(CaO)_5(MgO)_4(Al_2O_3)_1$ layer 3 is deposited to a thickness of 200 nm by sputtering. This is followed by another ZnS—SiO$_2$ protective layer 4 being deposited to a thickness to about 90 nm. Then, a recording film 5 of $Ag_3Ge_{20}Sb_{22}Te_{55}$ with a high melting point (of up to 650° C.) is formed to a thickness of about 15 nm. Next, a ZnS—SiO$_2$ protective layer 6 is formed to about 15-nm thickness. Over this film an $Al_{96}Cr_4$ reflective layer 7 is formed to a thickness of 200 nm. Further, this layer is coated by an ultraviolet setting resin layer 8. This disk is bonded with another disk of the same construction with an adhesive layer 9 interposed therebetween. The second disk thus bonded has its layers designated by the same reference numbers as those of the first disk and attached with a prime ('), and their detailed explanations are omitted.

Next, the principle of recording and playback will be explained. This embodiment uses a film, such as a Co—Si—Na—Ca—Mg—Al—O film, that has a heat resistance and a property such that the refractive index of the film changes when it is radiated with a laser beam with a power in excess of a threshold. An optical memory device for performing the recording and playback operations on the recording medium containing such a mask layer (super-resolution layer) has at least a light source (semiconductor laser), a means for moving the recording medium relative to the light source (e.g., disk rotation motor), a means for focusing light from the light source onto the mask layer of the recording medium (focusing lens), a means for adjusting the output of the light source (laser driver), a means for detecting a return light from the recording medium, and an autofocusing and tracking means. The wavelength of the light source is 660 nm and the numerical aperture (NA) of the focusing lens is 0.6. Further, a means should preferably be used which increases the laser power only when the information is read out and, at other times, sets the laser power at a low value just strong enough to perform autofocusing and tracking, because this prolongs the life of the mask layer. The wavelength of the light source is preferably in a range between 350 nm and 800 nm, more preferably in a 400 to 430 nm range and a 630 to 680 nm range as the lasers in these ranges are easily available. The NA is preferably in the range of 0.5 to 0.7 since the lenses in this range are easily available. First, a beam projected from the semiconductor laser is focused through the substrate 1 onto the mask layer 3. At this time, the refractive index changes in a portion of the mask layer 3 where the power of the beam exceeds the threshold. Then, the beam that has passed through portions of the mask layer 3 within a light spot is applied to the recording film 5. The light that has passed through the recording film 5 is reflected by a reflective layer 7 and returns to the incoming side. In this process, a multiple reflection is caused by interfaces of layers. As a result, when the reading laser power is at around 1 mW, almost entire area within the light spot becomes a mask region, making the playback signal difficult to see. In an area where the refractive index was changed by the radiation of a 4-mW laser beam, the difference in the amount of reflected light between the crystalline state and the amorphous state becomes large, allowing the playback signal to be recognized. On the other hand, an area where the refractive index remains unchanged is masked and an super-resolution effect can be obtained. By recording a signal made up of recurring marks and spaces of equal lengths and changing their lengths, a super-resolution effect appears where the lengths of the marks and spaces are short. This effect is observed when a laser power of 1 mW is used to read data from the disk, i.e., when the difference between the amount of reflected light obtained with the light spot located at the center of a mark (the amount of light reflected from the mark, or a bottom value of the reproduced signal waveform) and the amount of reflected light obtained with the light spot located at the center of a space between the marks (the amount of light reflected from the space, or a peak value of the reproduced signal waveform) decreases to 25 or below, with the amount of reflected light from the space taken as 100. In a reading laser power range of 2 to 4 mW, higher than 1 mW, there is a power such that the difference between the amount of reflected light from a mark and the amount of reflected light from a space between the marks is 30 or higher, with the amount of reflected light from the space taken as 100. Here, in the entire range of 1.5 to 4 mW, the difference in the amount of reflected light is 30 or more. In the case of general digital data which comprises a plurality of mark lengths and space lengths, too, the similar super-resolution effect is observed if we focus on mark and space portions with shorter lengths (0.4 $\mu$m or less). These experiments all use a reproduced waveform equalizing circuit optimized for general digital data. The provision of a means that uses a laser power of 1 mW for autofocusing and tracking, except for reading a signal, prevents degradation of the mask layer 3 and produces a good super-resolution characteristic.

A super-resolution optical system is employed which shields a part of a light path running up to the light outgoing side of the focusing lens that focuses light onto the recording medium.

In this embodiment, the mask layer 3 is formed between the two inorganic protective layers 2, 4. This structure increases a mechanical strength and therefore the number of times that the read and write operations can be performed. For example, in the disk structure of this embodiment, 1,000 rewriting operations do not cause a large increase in noise level. When the mask layer 3 is formed directly on the substrate 1, however, because the substrate 1 is deformed according to the information signals, some information is left undeleted and the noise level increases about 5 dB for every 10 rewriting operations.

The material of the inorganic protective layers 2, 4 between which the mask layer 3 is interposed preferably includes at least one of oxide, sulfide, nitride, carbide and fluoride, these melting point is known as 600° C. or more.

Figure 3:
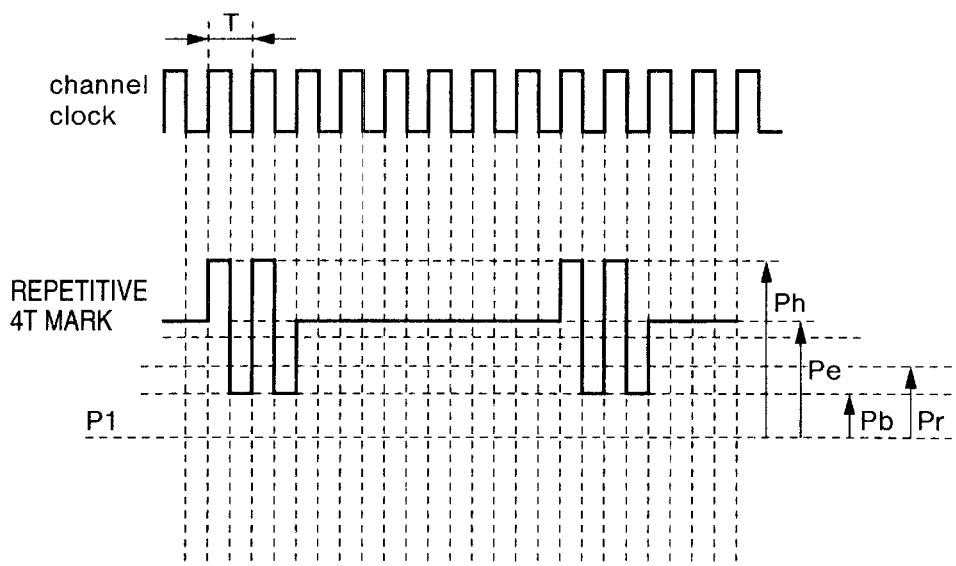
FIG. 3 is a schematic diagram showing recorded and reproduced waveforms used in experiments of the optical recording medium of the invention.

The experiment in this embodiment uses a recording waveform consisting of 4T marks and 4T spaces based on a channel clock with a period of T as shown in FIG. 3. Where an erase power is radiated, the previous information is erased. In FIG. 3, P1 represents a zero power, Pb a bottom power, Pr a read power, Pe an erase power, and Ph a high-level power.

Shown below are erase ratio values obtained in the experiment when the ratio of the erase power and the high-level power is changed.

| Erase power | Erase ratio |
| --- | --- |
| (recording power × 0.3) | 20 dB |
| (recording power × 0.4) | 26 dB |
| (recording power × 0.5) | 28 dB |
| (recording power × 0.6) | 28 dB |
| (recording power × 0.7) | 26 dB |
| (recording power × 0.8) | 24 dB |

The above result shows that setting the erase power in a range of 0.4 to 0.7 times the recording high-level power can reduce the leftover information that failed to be erased. It is particularly preferred that the erase power be set in the range of 0.5 to 0.6 times the high-level power.

In this embodiment, by changing the thickness of the protective layers 2, 4, it is possible to make the reproduced signal difficult to see where the refractive index is not changed and also to make the reproduced signal difficult to recognize in a region where the refractive index is changed. The portion where the refractive index is changed is about 0.5 μm across, and in the recording medium of a type in which the reproduced signal is not easily seen with the refractive index unchanged, recorded information on the same track that is to be read next and information on the next track are not read out. Hence, the recording track density is 1.5 times higher than the conventional device and the line density is 1.5 times higher with the result that the total capacity is about two times larger.

This embodiment uses a super-resolution optical system and thus ring-shaped portions called side lobes with an increased intensity of light appear at the periphery of the light spot. In the record medium of a type in which the reproduced signal is not easily identified with the refractive index unchanged, the reflectivity of the recording medium in this state is relatively low and, when the super-resolution effect is to be produced with the reading laser power set at 2 to 4 mW, the reflectivity of a major part of the side lobe region remains low and the difference in reflectivity between the crystalline state and the amorphous state is small, making it possible to prevent cross talks from adjacent tracks and tracking instability due to influences of the side lobes.

Rather than using the oxide mask layer 3 of this embodiment, other non-linear optical material layer may be used which has at least one of real part and imaginary part (attenuation coefficient) of its reflective index changed by irradiation of light. With this material, however, the number of times that the read operations can be performed decreases. In this invention, the refractive index of the mask layer 3 is 2.5 to 2.0.

The mask layer 3 can produce the super-resolution effect if the mask layer 3 contains at least one of chemical elements in the groups Ib, IIb, IIIa to VIIa, and VIII in 10 to 40 atomic percent and also includes oxygen. It is further preferred that the mask layer contain silicon, too.

For the noise not to rise by more than 3 dB after 1,000 or more rewriting operations, it is required that, of the constitutional components of the mask layer 3, one or more components whose melting point is 100° C. higher than the melting point of the recording film 5 occupy 80% or more of the total number of atoms of the mask layer 3.

It is further preferred that, of the constitutional components of the mask layer 3, one or more components whose melting point is 1000° C. or higher occupy 80% or more of the total number of atoms of the mask layer 3. In this case, almost no noise increase occurs.

For stable recording and playback, it is required that information recording be able to be performed with a power 2.5 to 8 times the laser power that causes a change in the refractive index.

Of the constitutional components of the recording film 5, one or more components with a composition of Ge—Sb—Te or In—Sb—Te should preferably occupy 80% or more of the total number of atoms of the recording film 5.

It is further preferred that the mask layer 3 contain at least one of elements, Co, Fe, Ni, Cr, Cu and Ag, in 10 to 40 atomic percent. Of these elements, Co exhibits the most desirable characteristic, followed by Fe, Ni and Cr. The disk shown in FIG. 2 represents a write/read structure. If the recording films 5, 5' and protective layers 4, 4' are eliminated from the structure of FIG. 2, a read-only structure can be obtained. In this case, information is written on either the substrate 1 or substrate 1'.

[Embodiment 2]

Figure 4:
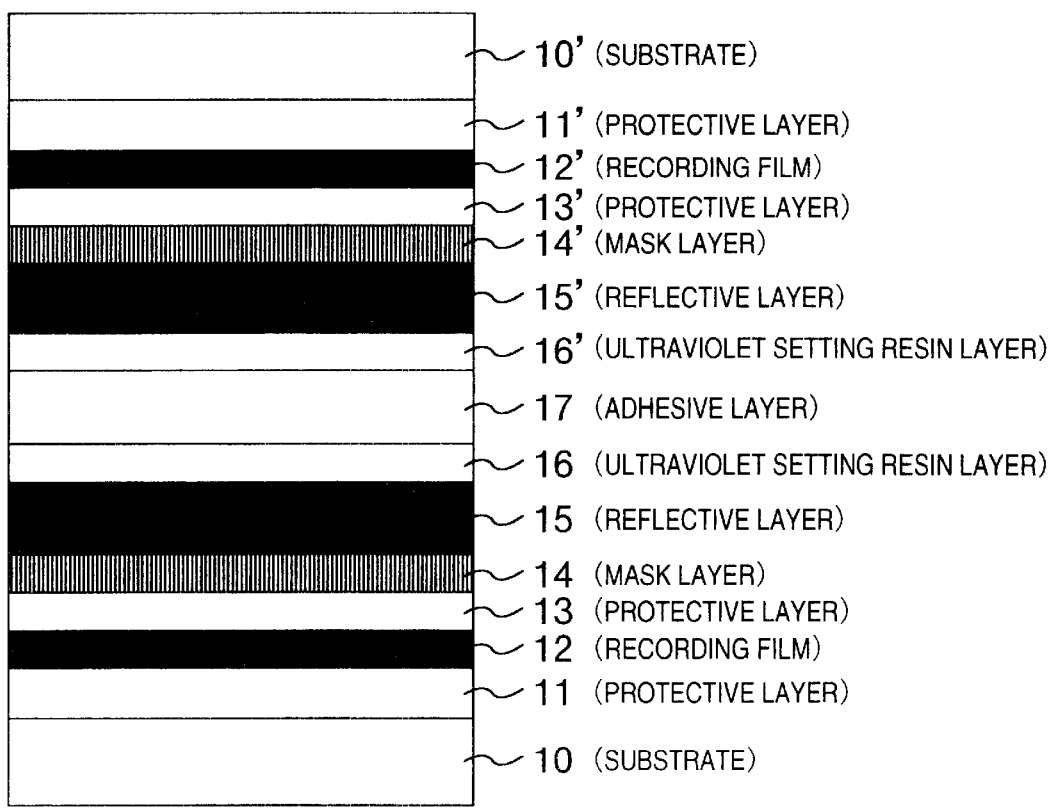
FIG. 4 is a cross section of an optical recording medium according to a second embodiment of the invention.

FIG. 4 shows one example cross-sectional structure of the disk according to this embodiment. The disk is made by first forming, by a magnetron sputtering, a ZnS—SiO$_2$ protective layer 11 to a thickness of about 90 nm over a polycarbonate substrate 10 which is 12 cm in diameter and 0.6 mm thick and which has a continuous groove therein. Over the ZnS—SiO$_2$ protective layer 11 a recording film 12 with a composition of AG$_3$Ge$_{20}$Sb$_{22}$Te$_{55}$ and a high melting point (about 650° C.) is deposited to a thickness of 15 nm by sputtering. This is followed by another ZnS—SiO$_2$ protective layer 13 being deposited to a thickness to about 20 nm. Further, a mask layer, a Co—Si—Na—Ca—Mg—Al—O layer 14, is deposited to a thickness of 40 nm. Over this layer an Al—Cr reflective layer 15 is deposited to a thickness of 100 nm. Further, this layer is deposited with an ultraviolet setting resin layer 16. This disk is bonded with another disk of the same construction with an adhesive layer 17 interposed therebetween. The second disk thus bonded has its layers designated by the same reference numbers as those of the first disk and attached with a prime ('), and their detailed explanations are omitted.

Next, the principle of recording and playback will be explained. This embodiment uses a film, such as a Co—Si—Na—Ca—Mg—Al—O film, that has a heat resistance and a property such that the refractive index of the film changes when it is radiated with a laser beam with a power in excess of a threshold. First, a beam projected from the semiconductor laser is shone through the substrate 10 onto the recording film 12. The beam that has passed through the recording film 12 is applied to a mask layer 14. At this time, the refractive index changes in a portion of the mask layer 14 where the threshold power for causing a change in the refractive index is exceeded. Then, the beam that has passed through portions of the mask layer 14 within a beam spot is reflected by a reflective layer 15 and returns to the incoming side. In this process, a multiple reflection is caused by interfaces of layers. As a result, when the reading laser power is at around 1 mW, almost entire area within the light spot becomes a mask region, making the playback signal difficult to identify. In an area where the refractive index was changed by the radiation of a 4-mW laser beam, the difference in the amount of reflected light between the crystalline state and the amorphous state becomes large, allowing the playback signal to be seen. On the other hand, an area where the refractive index remains unchanged is masked and an super-resolution effect can be obtained. Reducing the size of an area where the reproduced signal can be seen, can increase the recording density. The provision of a means that uses a laser power of 1 mW for autofocusing and tracking, except for reading a signal, prevents degradation of the mask layer 14 and produces a good super-resolution characteristic.

In this embodiment, the mask layer 14 is formed between the protective layer 13 and the reflective layer 15. This structure with the mask layer formed between the inorganic layers increases a mechanical strength and therefore the number of times that the rewriting operations can be performed. For example, in the disk structure of this embodiment, 10,000 rewriting operations do not cause an increase in noise level. By forming the mask layer 14 in direct contact with the reflective layer 15, or forming the mask layer 14 near the reflective layer 15 with other thin layer interposed therebetween, heat generated in the mask layer 14 is quickly released to the reflective layer, thus reducing damages that would otherwise be caused by heat. This advantage is particularly conspicuous when the mask 14 is formed in contact with the reflective layer 15 or when the other thin layer between the reflective layer 15 and the mask layer 14 is formed to a thickness of 30 nm or less. The materials used to form protective layers other than the reflective layer 15 in contact with the mask layer 14 should preferably include at least one of oxide, sulfide, nitride, carbide, fluoride and boride, all known to have a melting point of 600° C. or more.

This embodiment uses a recording waveform as shown in FIG. 3. Where an erase power is applied, the previous information is erased.

The reading of information is done by using a continuous beam of 4 mW, which enables reproduction of information in a very small portion.

In this embodiment, by changing the thickness of the protective layers 11, 13, it is possible to make the reproduced signal difficult to identify where the refractive index is not changed and also to make the reproduced signal difficult to see in a region where the refractive index is changed. The portion where the refractive index is changed is about 0.5 $\mu$m across, and in the recording medium of a type in which the reproduced signal is not easily seen with the refractive index unchanged, recorded information on the same track that is to be read next and information on the next track are not read out. Hence, the recording track density is 1.5 times higher than the conventional device and the line density is 1.5 times higher with the result that the total capacity is about two times larger.

This embodiment uses a super-resolution optical system and thus ring-shaped portions called side lobes with an increased intensity of light appear at the periphery of the light spot. In the recording medium of a type in which the reproduced signal is not easily seen with the refractive index unchanged, the reflectivity of the recording medium in this state is relatively low and, when the super-resolution effect is to be produced with the reading laser power set at 2 to 4 mW, the reflectivity of a major part of the side lobe region remains low, making it possible to prevent cross talks from adjacent tracks and tracking instability due to influences of the side lobes.

Rather than using the oxide mask layer of this embodiment, other non-linear optical material layer may be used which has at least one of real part and imaginary part (attenuation coefficient) of its reflective index changed upon application of light. With this material, however, the number of times that the read operations can be performed decreases. In this invention, the refractive index of the mask layer 14 is 2.5 to 2.0.

The mask layer 14 can produce the super-resolution effect if the mask layer contains at least one of chemical elements in the groups Ib, IIb, IIIa to VIIa, and VIII in 10 to 40 atomic percent and also includes oxygen. It is further preferred that the mask layer include silicon, too.

For the noise not to rise by more than 3 dB after 1,000 or more rewriting operations, it is required that, of the constitutional components of the mask layer 3, one or more components whose melting point is 100° C. higher than the melting point of the recording film occupy 80% or more of the total number of atoms of the mask layer 14.

It is further preferred that, of the constitutional components of the mask layer 14, one or more components whose melting point is 1000° C. or higher occupy 80% or more of the total number of atoms of the mask layer 14. In this case, almost no noise increase occurs.

For stable recording and playback, it is required that information recording be able to be performed with a power 2.5 to 8 times the laser power that causes a change in the refractive index.

Of the constitutional components of the record film 12, one or more components with a composition of Ge—Sb—Te or In—Sb—Te should preferably occupy 80% or more of the total number of atoms of the recording film 12.

It is further preferred that the mask layer 14 contain at least one of elements, Co, Fe, Ni, Cr, Cu and Ag, in 10 to 40 atomic percent. Of these elements, Co exhibits the most desirable characteristic, followed by Fe, Ni and Cr. The disk shown in FIG. 4 represents a write/read structure. If the recording films 12, 12' and protective layers 11, 11' are eliminated from the structure of FIG. 4, a read-only structure can be obtained. In this case, information is written on either the substrate 10 or substrate 10'.

Industrial Applicability

By combining mask layer of a novel inorganic material with a phase change recording film and a reflective film to provide an optical characteristic that contributes to producing the super-resolution effect, high-density recording and playback are possible. Because the inorganic material is used, the recording medium containing the mask layer has high mechanical and thermal strengths and therefore an increased number of times that the read and rewrite operations can be performed. Interposing the mask layer between other inorganic protective layers can further enhance the mechanical and thermal strengths. Further, forming the inorganic protective layer on one side of the mask layer as a reflective layer with a high thermal conductivity increases the thermal strength. It is also possible to avoid adverse effects of the side lobes in the light spot by combining the recording medium with a super-resolution optical system.

What is claimed is:

1. An optical recording medium that enables at least information to be read out by irradiation of a light, comprising:

a mask layer containing at least one of elements in groups Ib, IIb, VIa and VIII in 10 to 40 atomic percent and also containing oxygen;

wherein when a read operation is performed at a reading laser power of mW by using a lens with a predetermined wavelength and a predetermined numerical aperture and with a light spot focused to nearly a diffraction limit, a difference between an amount of reflected light from recording marks and an amount of reflected light from spaces between the recording marks is no greater than 25 with the amount of reflected light from the spaces taken as 100, and there is a laser power in a reading laser power range of 2 to 4 mW that causes a difference between an amount of reflected light from spaces between the recording marks to be at least 30 with the amount of reflected light from the spaces taken as 100.

2. An optical recording medium that enables at least information to be read by irradiation of a light, comprising:
- a mask layer containing at least one of elements in groups Ib, VIa and VIII in 10 to 40 atomic percent and also oxygen;
- wherein when a read operation is performed by using a lens with a predetermined numerical aperture and with a light spot focused to nearly a diffraction limit, there is a laser power in a reading laser power range of 2 to 4 mW that causes a difference between an amount of reflected light from recording marks and an amount of reflected light from spaces between the recording marks to be no greater than 25 with the amount of reflected light from the spaces taken as 100, and in a lower laser power range there is a laser power that causes a difference between an amount of reflected light from recording marks and an amount of reflected light from spaces between the recording marks to be at least 30 with the amount of reflected light from the spaces taken as 100.

3. An optical recording medium according to claim 1, wherein inorganic protective layers are provided on both sides of the mask layer.

4. An optical recording medium according to claim 1, wherein the mask layer is formed between a recording film and a reflective layer.

5. An optical recording medium according to claim 1, wherein the mask layer is formed between a recording film and a substrate.

6. An optical recording medium according to claim 1, wherein the mask layer contains at least one of elements, Co, Fe, Ni, Cr, Cu and Ag, in 10 to 40 atomic percent.

7. An optical recording medium according to claim 1, wherein, of constitutional components of the mask layer, at least one component whose melting point is more than 100° C. higher than the melting point of the recording film occupy at least 80% of the total number of atoms of the mask layer.

8. An optical recording medium according to claim 1, wherein, of constitutional components of the mask layer, at least one component whose melting point is at least 1000° C. occupy at least 80% of the total number of atoms of the mask layer.

9. An optical recording medium according to claim 4, wherein information is recorded at 2.5 to 8 times a laser power which produces a difference in the amount of reflected light of no greater than 25.

10. An optical recording medium according to claim 4, wherein, of constitutional components of the recording film, at least one component with a composition of Ge—Sb—Te or In—Sb—Te occupy at least 80% of the total number of atoms of the recording film.

11. An optical recording medium according to claim 1, wherein the optical recording medium is a read-only medium.

12. An optical recording medium according to claim 3, wherein a refractive index of the mask layer is 2.5 to 2.0.

* * * * *